United States Patent [19]

Wakemoto et al.

[11] Patent Number: 4,778,619

[45] Date of Patent: Oct. 18, 1988

[54] LIQUID CRYSTAL COMPOSITIONS

[75] Inventors: Hirofumi Wakemoto; Shoichi Ishihara; Yoshihiro Matsuo, all of Osaka, Japan

[73] Assignee: Matsushita Electric Industrial Co., Ltd., Osaka, Japan

[21] Appl. No.: 842,648

[22] Filed: Mar. 21, 1986

[30] Foreign Application Priority Data

Mar. 22, 1985 [JP] Japan .................. 60-58675
Aug. 12, 1985 [JP] Japan .................. 60-177120

[51] Int. Cl.$^4$ ................. G02F 1/13; C09K 19/00
[52] U.S. Cl. ......................... 252/299.1; 350/349
[58] Field of Search ................. 252/299.1; 350/349

[56] References Cited

U.S. PATENT DOCUMENTS

| | | | |
|---|---|---|---|
| 3,597,044 | 8/1971 | Castellano | 252/299.1 |
| 4,145,114 | 3/1979 | Coates et al. | 252/299.1 |
| 4,151,170 | 4/1979 | Gosteli . | |
| 4,394,070 | 7/1983 | Brown et al. | 252/299.1 |
| 4,588,517 | 5/1986 | Kaneko et al. | 252/299.1 |

FOREIGN PATENT DOCUMENTS

| | | | |
|---|---|---|---|
| 76633 | 4/1983 | European Pat. Off. | 252/299.1 |
| 3300587 | 7/1984 | Fed. Rep. of Germany | 252/299.1 |
| 1282232 | 12/1961 | France . | |
| 2336450 | 7/1977 | France . | |
| 2370242 | 6/1978 | France . | |
| 59-182877 | 10/1984 | Japan | 252/299.1 |
| 59-182878 | 10/1984 | Japan | 252/299.1 |
| 61-162581 | 7/1986 | Japan | 252/299.1 |
| 61-162580 | 7/1986 | Japan | 252/299.1 |
| 1554192 | 10/1979 | United Kingdom . | |

OTHER PUBLICATIONS

Cox, R. J., Mol. Cryst. Liq. Cryst., vol. 55, pp. 1–32 (1979).

*Primary Examiner*—Teddy S. Gron
*Attorney, Agent, or Firm*—Lowe, Price, LeBlanc, Becker & Shur

[57] ABSTRACT

Liquid crystal compositions comprising indigo dyes which have a benzene ring having a branched alkyl group introduced thereinto. The indigo dyes have improved solubilities in host liquid crystal materials and are suitable for guest-host liquid crystal display.

9 Claims, No Drawings

LIQUID CRYSTAL COMPOSITIONS

BACKGROUND OF THE INVENTION

1. Field of the Invention

This invention relates to liquid crystal compositions and more particularly, to guest-host liquid crystal compositions comprising indigo dyes as a guest dye.

2. Description of the Prior Art

Liquid crystal displays making use of the guest-host interaction effect are generally called guest-host (hereinafter referred to simply as G-H) displays. This type of display makes use of a G-H liquid crystal composition in which a dichroic or pleochroic dye is dissolved in a host liquid crystal. The host liquid crystal materials may include a variety of liquid crystal materials such as nematic liquid crystals, chiral nematic liquid crystals, cholestric liquid crystals, smectic A liquid crytals and chiral smectic C liquid crystals and the like.

As is known in the art, the contrast of the G-H liquid crystal displays is largely influenced by the order parameter, S, of the dichroic dye in the host liquid crystal. This parameter can be experimentally determined according to the following equation $$S = (A_{\parallel} - A_{\perp})/(A_{\parallel} + 2A_{\perp})$$

in which $A_{\parallel}$ and $A_{\perp}$ are, respectively, absorbances of the dye obtained by passing linear polarized light along the directions parallel and perpendicular to the direction of orientation (or the director direction) of the host liquid crystal. In G-H liquid crystal display devices using parallel dichroic dyes (P-type dyes), a display of a higher contrast becomes possible as the order parameter, S, comes closer to 1.

On the other hand, the characteristics required for pleochroic dyes used in G-H liquid crystal displays include, aside from the order parameter, S, a high solubility in host liquid crystal and a high durability on application as a display device.

Most pleochroic dyes ordinarily used in G-H liquid crystal displays are azo and anthraquinone dyes with a variety of chemical structures.

In spite of the fact that indigo dyes have generally good durability, they have never been known for use in G-H liquid crystal display devices as pleochroic dyes. The most serious problem involved in indigo dyes on use as a dichroic dye for G-H liquid crystal display is that they have a very low solubility in host liquid crystal. This means that the G-H liquid crystal compositions comprising indigo dyes dissolved in host liquid crystals are rarely colored and cannot thus be applied for G-H liquid crystal displays.

SUMMARY OF THE INVENTION

It is an object of the invention to provide G-H liquid crystal compositions which comprise indigo dyes which have an improved solubility in host liquid crystal whereby coloration sufficient for a liquid crystal display is ensured.

It is another object of the invention to provide G-H liquid crystal compositions whose order parameter, S, in host liquid crystal is enhanced, so that a G-H liquid crystal display device of high constrast can be obtained.

The above objects can be achieved, according to the invention, by a G-H liquid crystal composition which comprises, as a guest dye dissolved in a host liquid crystal, at least one indigo dye of the general formula (I)

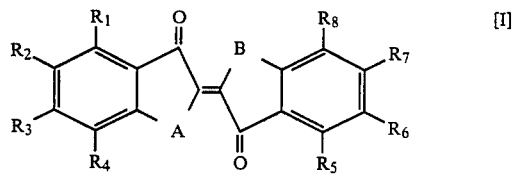

in which A and B independently represent S or N-Y in which Y represents an alkyl group having from 1 to 3 carbon atoms, an acyl group having from 2 to 4 carbon atoms or a hydrogen atom, $R_2$ represents a branched alkyl group, $R_6$ represents a a hydrogen atom, a branched or linear alkyl group, a cycloalkyl group, an aryl group or an aryloxy group, $R_1$, $R_3$, $R_4$, $R_5$, $R_7$ and $R_8$ independently represent a hydrogen atom, a halogen atom, an alkyl group, an alkoxy group, a nitro group, an amino group, $-NR_9R_{10}$, $-NHCOR_9$, $-COR_9$, $-COOR_9$, $-CONR_9R_{10}$, $-SO_2R_9$ or $-SO_3R_9$ in which each $R_9$ represents an alkyl group and each $R_{10}$ represents a hydrogen atom or an alkyl group. The indigo dyes of the invention have high solubiity in liquid crystal materials by introduction of a branched alkyl group as $R_2$ into the benzene ring of the dye. The liquid crystal materials in which the dye is dissolved may be any known materials used in the G-H liquid crystal composition and preferably include biphenyls, hexylcyclohexanes, pyrimidines and the like. The indigo dyes are usually dissolved in amounts ranging from 0.1 wt% to a saturation.

DETAILED DESCRIPTION AND EMBODIMENTS OF THE INVENTION

The indigo dyes of the general formula (I) used in the present invention are prepared according to different processes depending on the types of A and B in the formula wherein (a) A and B are both S, (b) A and B are both N-Y in which Y represents an alkyl group having from 1 to 3 carbon atoms, an acyl group having from 2 to 4 carbon atoms or a hydrogen atom, and (c) one of A and B is S and the other is N-Y. The general processes of preparing the respective types of dyes are described below.

(a) Process of preparing indigo dyes of the formula (I) where A and B are both S:

Indigo dyes of the formula (I) where A and B are both S can be prepared according to the procedure a-1 or a-2

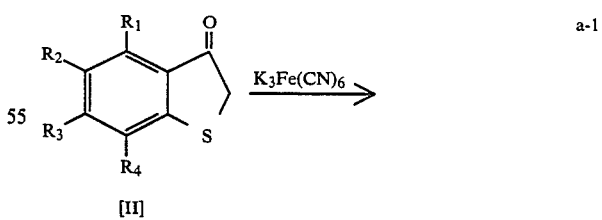

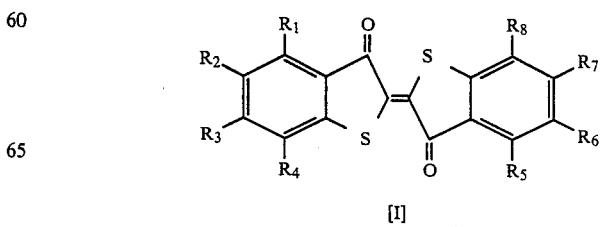

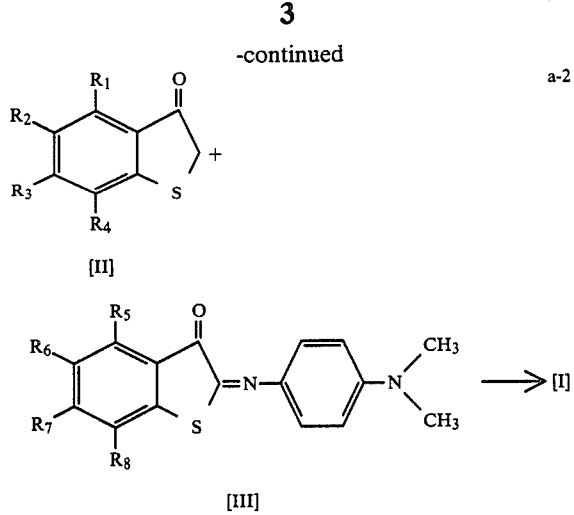

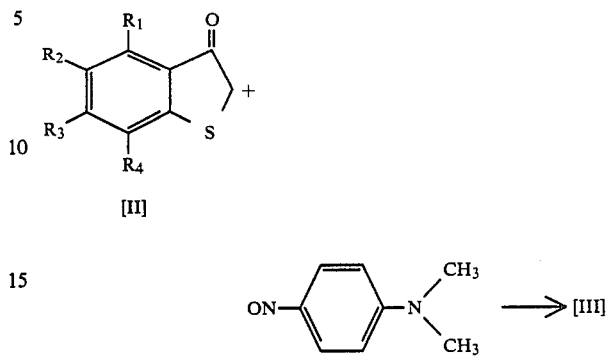

in which, as defined before, $R_2$ represents a branched alkyl group, $R_6$ represents a hydrogen atom, a branched or linear alkyl group, a cycloalkyl group, an aryl group or an aryloxy group, $R_1$, $R_3$, $R_4$, $R_5$, $R_7$ and $R_8$ independently represent a hydrogen atom, a halogen atom, an alkyl group, an alkoxy group, a nitro group, an amino group, $-NR_9R_{10}$, $-NHCOR_9$, $-COR_9$, $-COOR_9$, $-CONR_9R_{10}$, $-SO_2R_9$ or $-SO_3R_9$ in which each $R_9$ represents an alkyl group and each $R_{10}$ represents a hydrogen atom or an alkyl group.

According to the procedure of a-1, dyes of symmetrical structures are obtained, whereas the procedure of a-2 provides dyes of asymmetrical structures. The benzothiophene derivatives of the general formula (II) are obtained through the following reaction sequence.

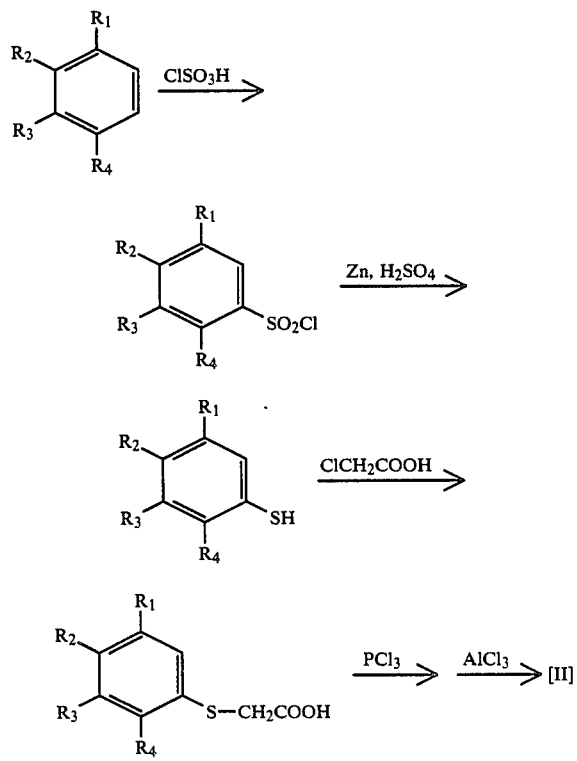

The imino derivatives of the general formula (III) are readily obtained by reaction between the compound (II)

(b) Process of preparing indigo dyes of the formula (I) where A and B are both N-Y (in which Y has a meaning as defined before):

According to the following procedure b-1, dyes of the formula (I) wherein A and B are both N-Y in which Y represents hydrogen are produced.

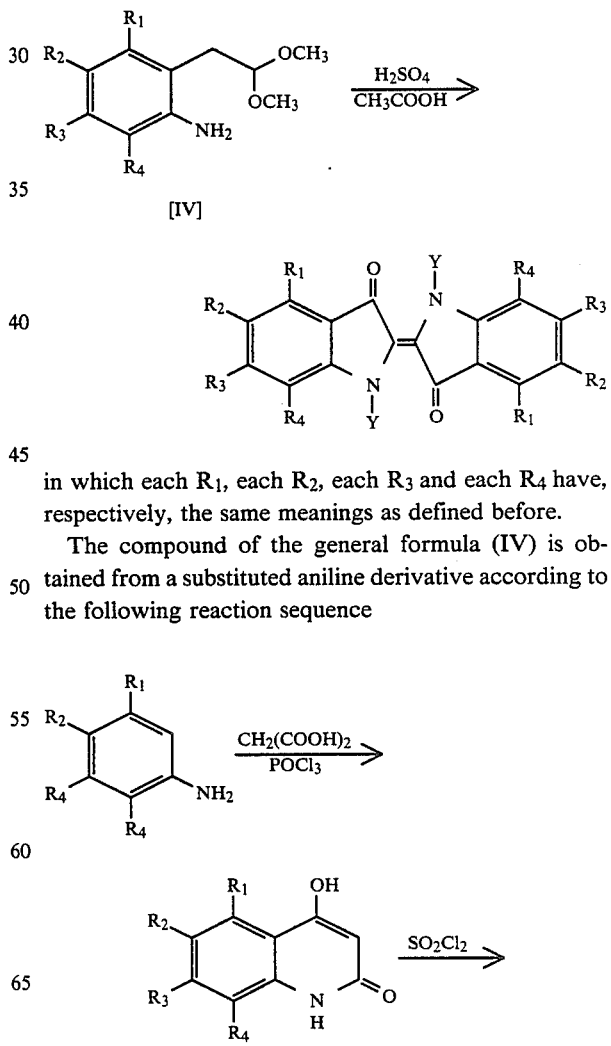

in which each $R_1$, each $R_2$, each $R_3$ and each $R_4$ have, respectively, the same meanings as defined before.

The compound of the general formula (IV) is obtained from a substituted aniline derivative according to the following reaction sequence

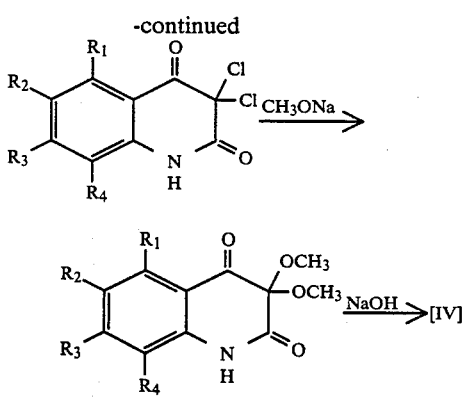

In the dyes obtained by the above procedure, Y=H. When a suitable alkylating or acylating agent is acted on the dyes for substitution of the hydrogen atom, N-alkylated or N-acylated products can be obtained. (c) Process of preparing indigo dyes of the formula (I) where one of A and B is S and the other is N-Y:

According to the following procedure c-1, there can be obtained dyes of the formula (I) in which one of A and B is S and the other is N-Y in which Y has the same meaning as defined before.

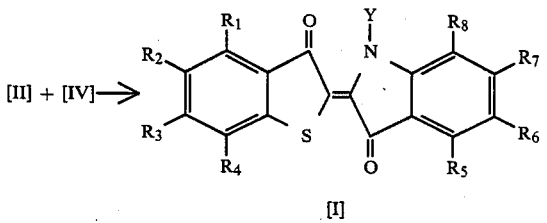

in which $R_2$ is a branched alkyl group as defined before, $R_6$ is a hydrogen atom, a branched or linear alkyl group, a cycloalkyl group, an aryl group or an aryloxy group as defined before provided that the cycloalkyl, aryl or aryloxy group may be substituted or unsubstituted, $R_1$, $R_3$, $R_4$, $R_5$, $R_7$ and $R_8$ are, respectively, a hydrogen atom, a halogen atom, an alkyl group, an alkoxy group, a nitro group, an amino group, —$NR_9R_{10}$, —$NHCOR_9$, —$COR_9$, —$COOR_9$, —$CONR_9R_{10}$, —$SO_2R_9$ or —$SO_3R_9$ in which each R represents an alkyl group and each $R_{10}$ represents a hydrogen atom or an alkyl group.

The dyes obtained by the above procedure are of the formula (I) in which Y=H. Similar to the case of (b), N-alkylation or N-acylation is possible using a suitable alkylating or acylating agent.

Where the indigo dyes (I) obtained by the procedures (a), (b) and (c) have hydrogen atoms on the benzene ring of the dye skelton, they may be modified by halogenation or nitration.

The indigo dyes of the general formula (I) according to the invention have great solubility in host liquid crystal materials and have greater solubility especially when $R_2$ in the formula is an alkyl group branched at the alpha carbon.

From the standpoint of the solubility, $R_2$ should preferably be a tertiary alkyl group having from 4 to 10 carbon atoms such as, for example, tert-butyl, tert-amyl and the like. From the standpoint of the dichromism, at least one of A and B should preferably be S and most preferably, both should be S, and $R_6$ should preferably be a 4-substituted phenyl group, 4-substituted cyclohexyl group or 4-substituted phenyloxy group whose substituent may be an alkyl, an alkoxy group, and the like. Alternatively, $R_6$ should preferably be the same as $R_2$.

Moreover, $R_1$, $R_3$, $R_4$, $R_5$, $R_7$ and $R_8$ are preferably hydrogen, a halogen such as chlorine or bromine, an alkyl group having from 1 to 3 carbon atoms, an alkoxy group having from 1 to 3 carbon atoms, a nitro group, an amino group, or —$NR_9R_{10}$ in which $R_9$ is an alkyl group having from 1 to 3 carbon atoms and $R_{10}$ is hydrogen or an alkyl group having from 1 to 3 carbon atoms.

The indigo dyes of the invention are, more or less, influenced in nature by combinations of the substituents particularly represented by $R_2$, $R_6$ and/or A and B. In this sense, a combination of a tertiary alkyl group as $R_2$ and a 4-substituted phenyl group or 4-substituted cyclohexyl group as $R_6$ is preferred. More preferably, A and B in the formula (I) are both S used in combination with a tertiary alkyl group as $R_2$ and the 4-substituted phenyl or cyclohexyl group as $R_6$.

The host liquid crystal materials useful in the present invention may be nematic, cholestric, smectic liquid crystals, of which nematic liquid crystal materials are preferred. Examples of the nematic liquid crystal materials include cyclohexylcyclohexanes, phenylcyclohexanes, biphenyls, terphenyls, cyclohexylcyclohexanoates, aromatic esters, aromatic, diesters, biphenylcyclohexylcarboxylates, biphenyl esters, aromatic thioesters, Schiff bases, pyrimidines, cyclohexyl methyl ethers, and the like, which are usually used as mixtures of two or more compounds.

The present invention is more particularly described by way of examples.

EXAMPLE 1

Synthesis of

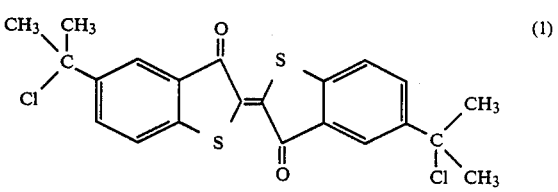

Three grams of 5-(1-chloro-1-methylethyl)-2,3-dihydrobenzo[b]thiophene-3-on was dissolved in an aqueous solution dissolving 12 g of potassium hydroxide therein, to which a solution of 15 g of potassium ferricyanide in 150 ml of water was added. After agitation at room temperature for 2 hours, the reaction solution was extracted with chloroform and the resulting chloroform phase was washed several times with water, followed by drying over anhydrous sodium sulfate. The resultant crude product was purified by column chromatography and recrystallized from benzene-petroleum benzine to obtain a dye. The thus obtained dye was identified by IR and NMR analyses.

EXAMPLE 2
Synthesis of

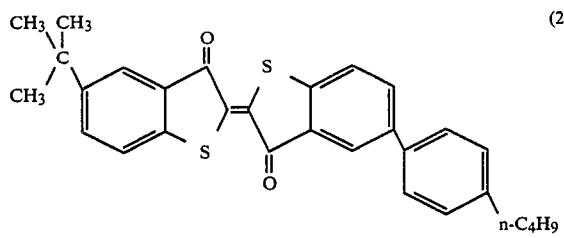 (2)

2.1 grams of 5-(1,1-dimethylethyl)-2,3-dihydrobenzo[b]thiophene-3-on and 4.2 g of 5-(4-butylphenyl)-2-(4-dimethylaminophenylimino)-2,3-dihydrobenzo[b]thiophene-3-on were heated in 100 ml of chlorobenzene along with 0.2 g of piperidine at 120° C. for 2 hours. The chlorobenzene was distilled off under reduced pressure and the resulting solid residue was isolated and purified by column chromatography and recrystallized from hexane-chloroform to obtain a dye. The chemical structure of the dye was identified in the same manner as in Example 1.

In the same manner as in Examples 1 and 2, there were obtained the following compounds Nos. 3 through 19.

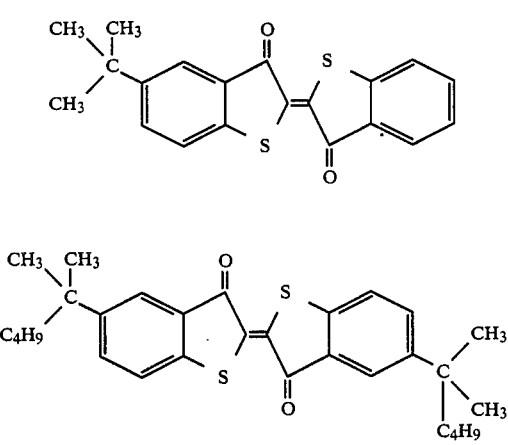

(3)

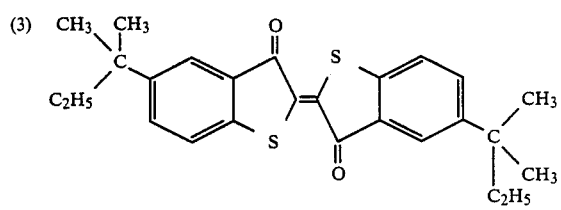

(4)

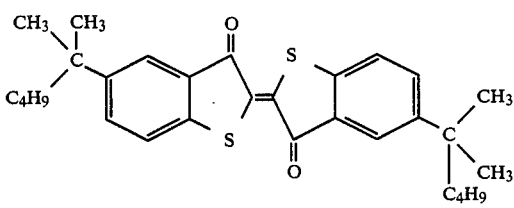

(5)

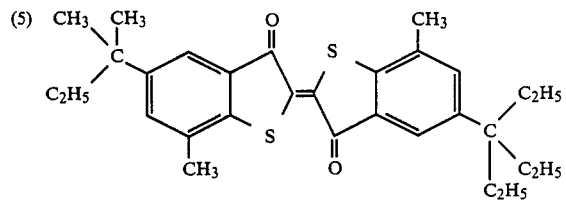

(6)

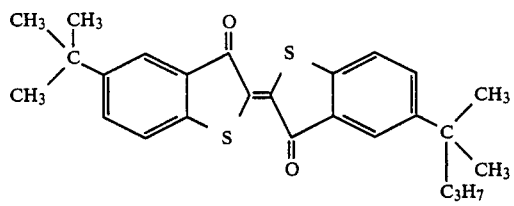

(7)

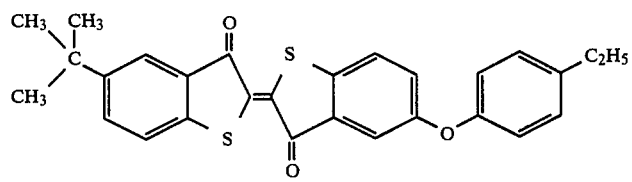

(8)

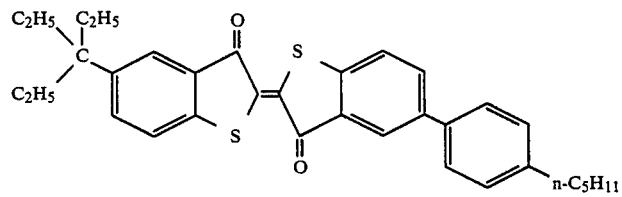

(9)

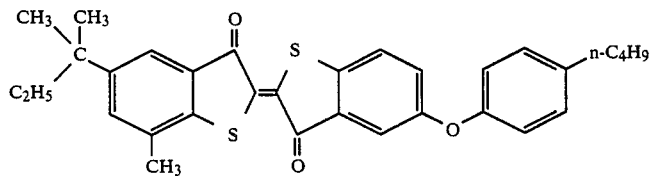

(10)

-continued
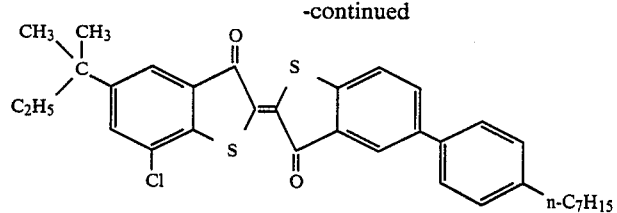 (11)
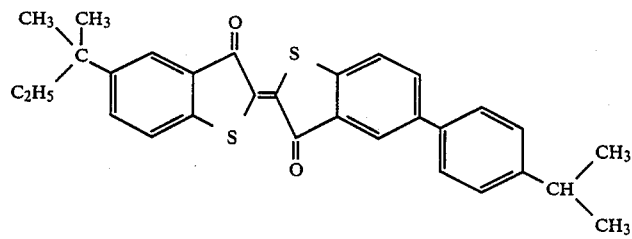 (12)
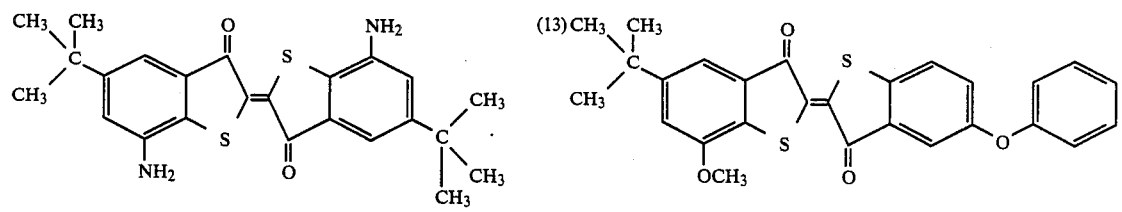 (13) (14)
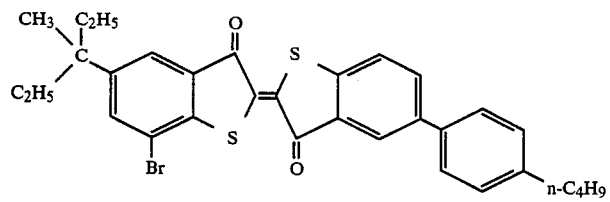 (15)
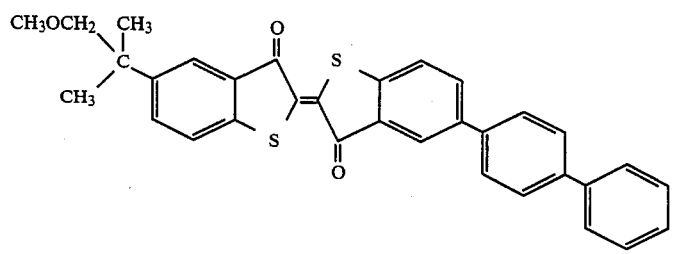 (16)
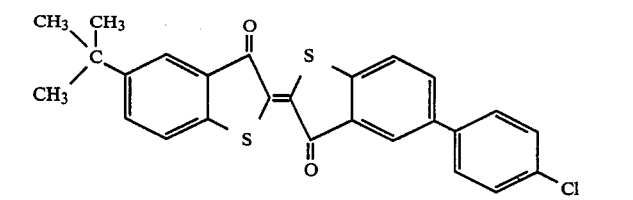 (17)
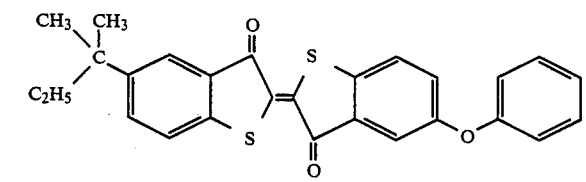 (18)
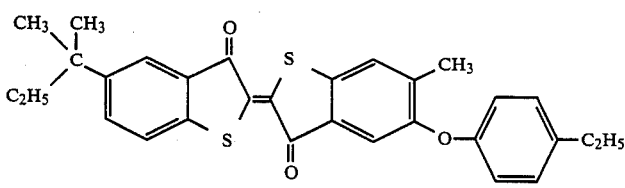 (19)

EXAMPLE 3

Synthesis of

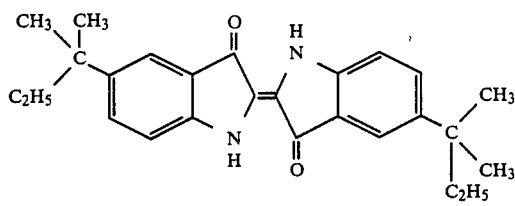
(20)

5.30 g of (5-t-amyl-2-aminophenyl)glyoxaldimethylacetal was dissolved in 100 ml of glacial acetic acid, to which 20 ml of concentrated sulfuric acid was added, followed by heating for 30 minutes. After cooling, 100 ml of water was added to the reaction solution and the resulting precipitate was filtered, followed by washing with water and drying. The crude product was purified by chloroform-silica gel column chromatography and recrystallized from hexane-chloroform to obtain 1.17 g of crystals of an indigo dye No. 20. This dye was subjected to identification of the chemical structure by NMR, IR, elementary and mass spectrometric analyses.

EXAMPLE 4

In a manner similar to Example 3, there were obtained compounds Nos. 21 through 26 of the following formulae.

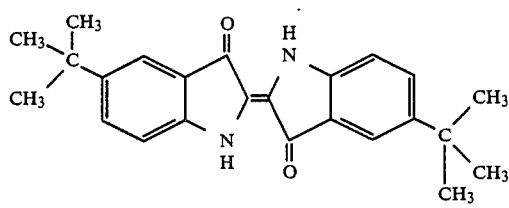
(21)

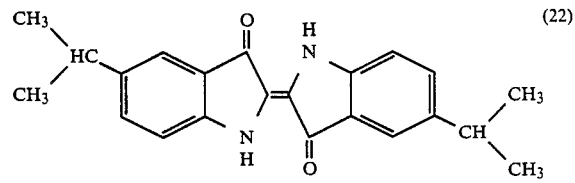
(22)

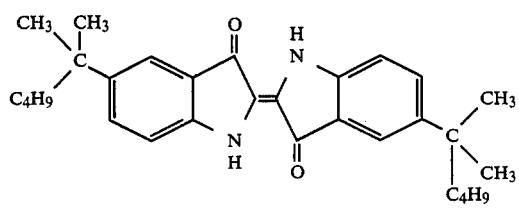
(24)

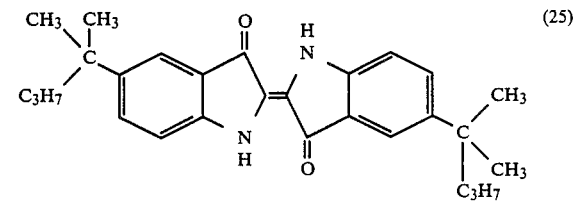
(25)

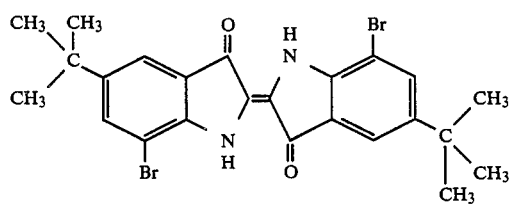
(26)

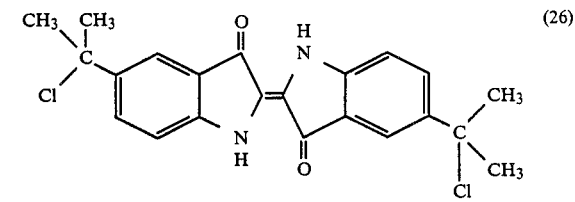
(26)

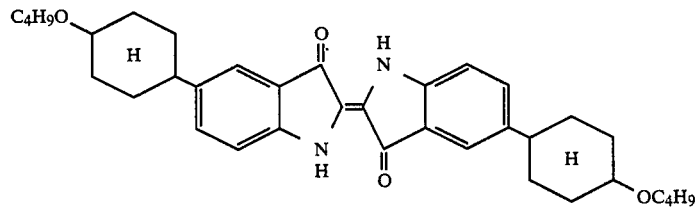

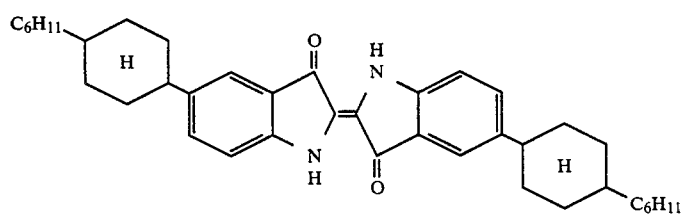

EXAMPLE 5

Synthesis of

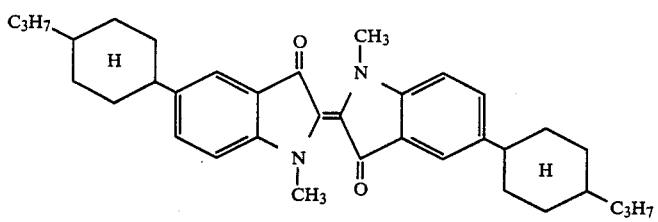

418 mg of the indigo dye No. 21 was dissolved in 50 ml of dimethylformamide, to which sodium hydride was added in slight excess, followed by agitation at room temperature for about 3 hours, by which the hydrogen of the amino group was withdrawn to give a sodium salt. After reaction with methyl iodide in excess at room temperature for about 12 hours, the reaction mixture was poured into an aqueous ammonium chloride solution and the resultant precipitate was separated by filtration and washed with water. The crude product was purified with silica gel column chromatography and recrystallized from benzene-hexane to obtain 180 mg of dye No. 27. The structural identification was made in the same manner as in Example 3.

Similarly, there was obtained compound No. 28 by reaction between compound No. 23 and ethyl iodide, with the following formula.

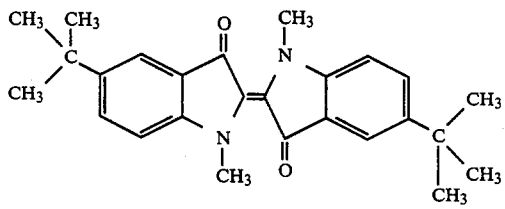

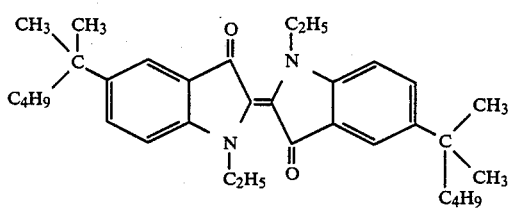

EXAMPLE 6

Synthesis of

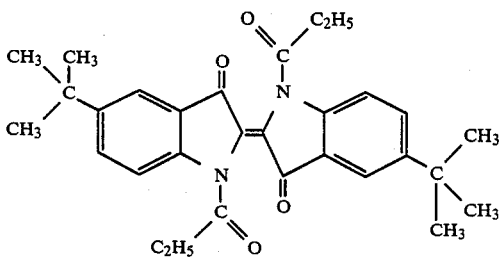

374 mg of indigo dye No. 21 was reacted in 10 ml of n-butyl acetate with 0.5 ml of propionyl chloride and 0.5 ml of 2,6-lutidine while agitating at 100° C. for 15 hours. The n-butyl acetate was distilled off under reduced pressure and the residue was dissolved in benzene and filtered to remove insoluble lutidine hydrochloride. The resultant filtrate was concentrated and purified by benzene-silica gel column chromatography and recrystallized from chloroform-ethanol to obtain 183 mg of dye No. 29. The structural identification was made in the same manner as in Example 3.

Similarly, there were obtained compound No. 30 by reaction between compound No. 22 and acetyl chloride and compound No. 31 by reaction between compound No. 24 and propionyl chloride, with the following formulae, respectively.

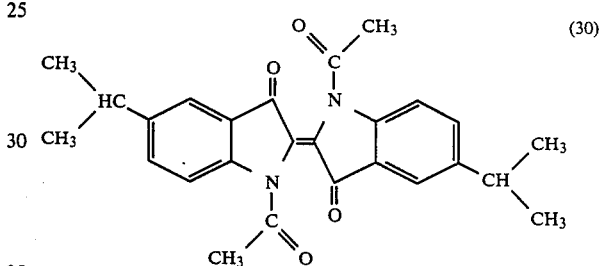

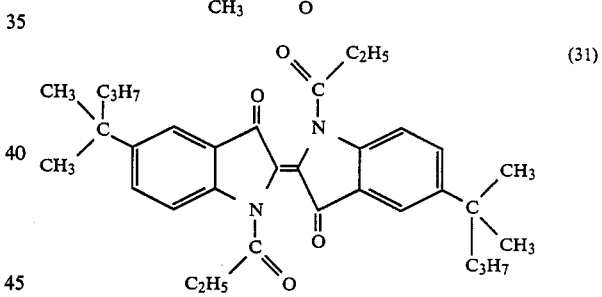

EXAMPLE 7

Synthesis of

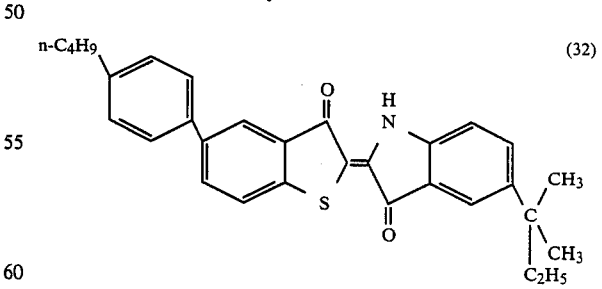

5.92 g of 5-(4-n-butylphenyl)-2,3-dihydrobenzo[b]thiophene-3-on and 5.30 g of (5-t-amyl-2-aminophenyl)-glyoxal-dimethylacetal were dissolved in a mixture of 70 ml of glacial acetic acid and 3 ml of concentrated sulfuric acid, followed by heating at 100° C. for 20 minutes. After cooling, the resultant reaction mixture was poured into 500 ml of water in which 110 g of KOH and 10 g of K$_3$Fe(CN)$_6$ were dissolved. After agitation at room temperature for 1 hour, the resulting precipitate was separated by filtration, purified by silica gel column chromatography, and recrystallized from hexane-chloroform to obtain 1.74 g of crystals of indigo dye No. 32. $\lambda_{max}$=570 nm.

5-(4-n-Butylphenyl)-2,3-dihydrobenzo[b]thiophene-3-on and (5-t-amyl-2-aminophenyl)glyoxal-dimethylacetal could be obtained from 4-n-butyl-4'-mercaptobiphenyl and 4-t-amylaniline according to the afore-indicated reaction sequence, respectively.

The following compounds Nos. 33 through 42 were prepared in a similar manner as described above.

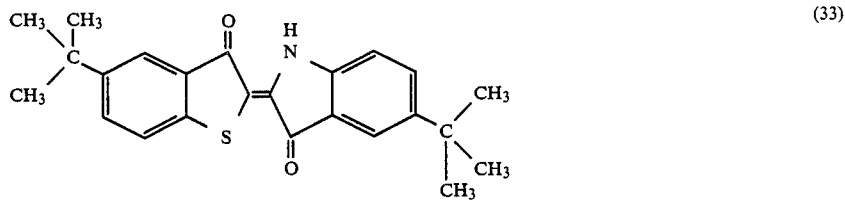

(33)

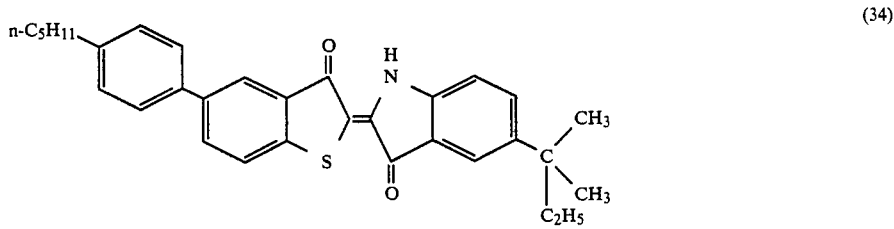

(34)

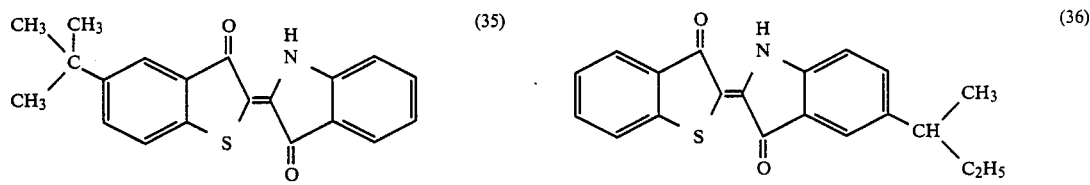

(35) (36)

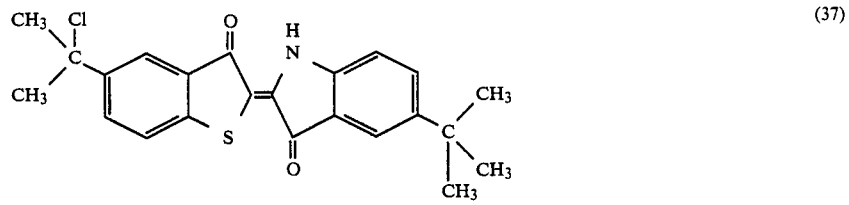

(37)

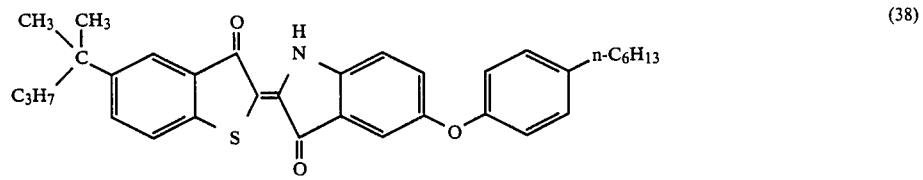

(38)

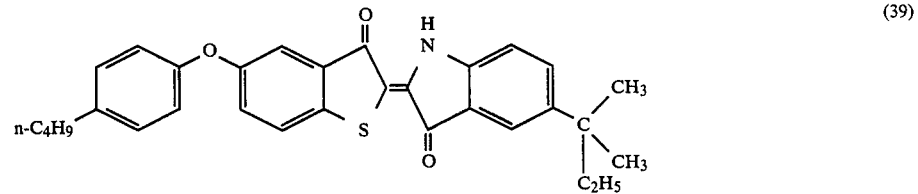

(39)

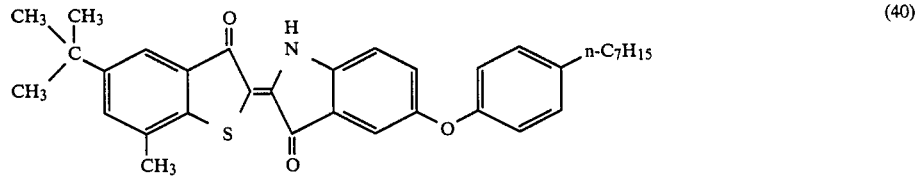

(40)

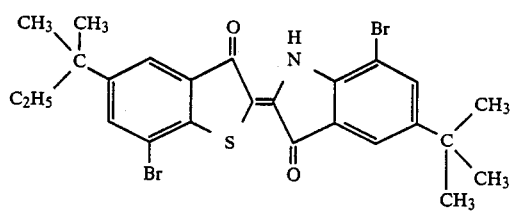 (41)

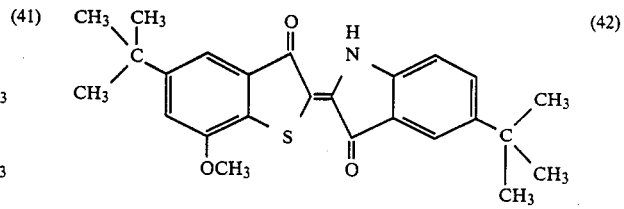 (42)

EXAMPLE 8

Synthesis of

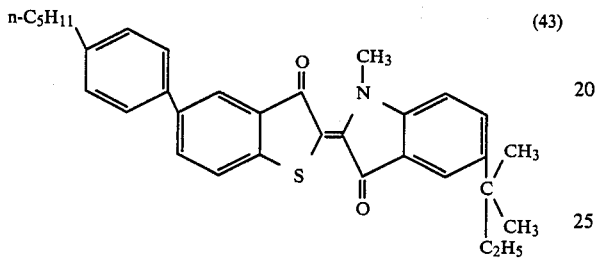 (43)

EXAMPLE 9

Synthesis of

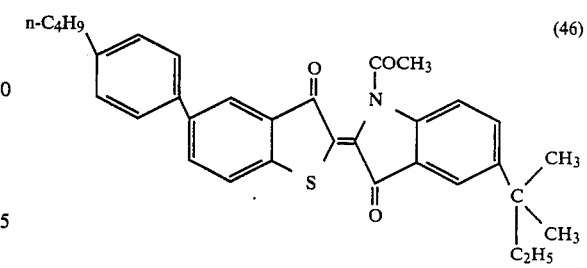 (46)

One gram of the indigo dye No. 34 obtained in Example 7 was dissolved in 150 ml of tetrahydrofuran, to which sodium hydride was added to withdraw the hydrogen atom from the amino group, thereby to obtain a sodium salt. Thereafter, the reaction mixture was subjected to reaction with methyl iodide in excess at room temperature for 12 hours, thereby obtaining crude dye No. 43. This dye was subjected to silica gel column chromatography and recrystallized from hexane-benzene to obtain a pure product.

Similarly, the following compounds Nos. 44 and 45 were, respectively, obtained by reaction between dye No. 37 and methyl iodide and by reaction between dye No. 38 and ethyl iodide.

4.77 g of dye No. 32 obtained in Example 7 was reacted with 1.96 g of acetyl chloride in 50 ml of acetic anhydride at 100° C. for 5 hours. The resulting reaction mixture was subjected to silica gel column chromatography and recrystallized from ethanol-chloroform to obtain dye No. 46.

Similarly, there were obtained dye No. 47 by reaction between dye No. 33 and acetyl chloride and dye No. 48 by reaction between dye No. 34 and propionyl chloride with the following formulae, respectively.

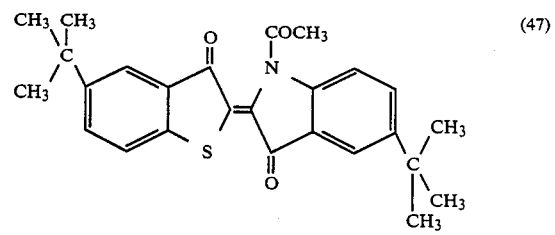 (47)

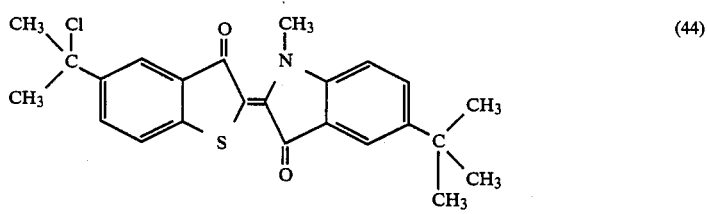 (44)

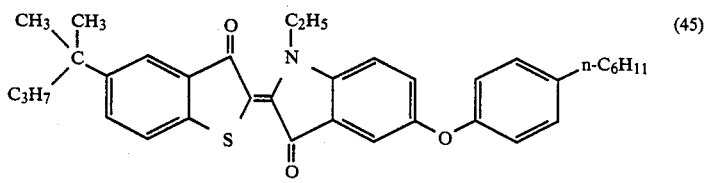 (45)

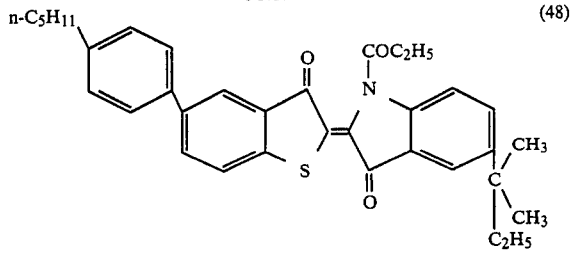

(48)

The indigo dyes which do not have any branched alkyl group as represented by $R_2$ of the general formula (I) are generally sparingly soluble and have thus low solubility in host liquid crystals, so that when they are used as G-H liquid crystal compositions, a satisfactory colored state cannot be obtained.

For instance, the solubilities, to a saturation, of unsubstituted indigo dyes of the following formulae 49, 50 and 51 in a mixed liquid crystal ZLI-2444, (a mixture of a phenylcyclohexane compound, a biphenylcyclohexane compound and a cyclohexylbiphenylcyclohexane compound, made by Merck Inc.) are below 0.1 wt%.

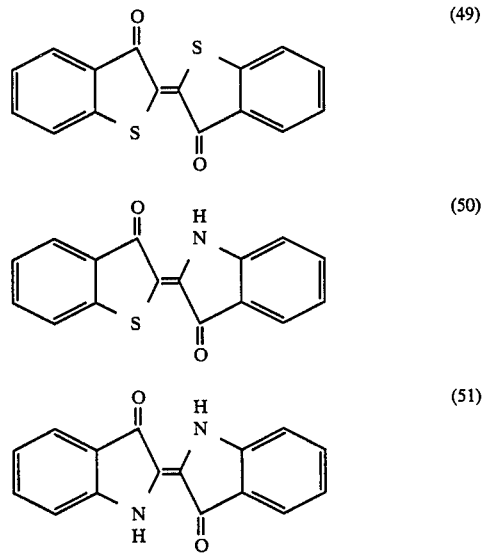

If these compositions are used in G-H liquid crystal display by charging a saturated solution into several to ten and several micrometers thick cells, the coloration is not satisfactory for the display service.

On the other hand, the indigo dyes of the general formula (I) according to the invention have high solubilities in host liquid crystal material and the solubility is generally not less than 0.1 wt%. Moreover, the order parameter affecting the display contrast is so large that the dyes of the invention are very useful as dyes for G-H liquid crystal display.

The solubility and order parameter of the dyes of the invention are particularly described in the following examples.

EXAMPLE 10

Dye No. 3 was subjected to measurement of solubility in ZLI-2444. Three weight percent of the dye was added to ZLI-2444, followed by heating and agitation in an isotropic liquid condition until the dye was completely dissolved. The solution was allowed to stand at a temperature of 20° C. for 2 weeks and the resulting dye crystals were separated by filtration to obtain a saturated solution. The saturated solution was diluted with xylene and subjected to measurement of absorption spectra, followed by calculation of the solubility from the relation with a predetermined absorptivity coefficient of the dye in xylene.

The solubility of the dye No. 3 in ZLI-2444 was found to be 1.3 wt%.

EXAMPLE 11

Dye No. 4 was dissolved in ZLI-2444 to prepare a saturated solution at 20° C. This solution was diluted with benzene and the solubility was calculated from the resultant absorptivity coefficient and found to be 2.54 wt%. This value demonstrates that the solubility is improved by two orders of magnitude over unsubstituted thioindigo.

The solubility of dyes varies depending on the chemical structure of dye. It was found that dye No. 5 had a solubility in ZLI-2444 of not less than 5 wt%.

EXAMPLE 12

Dye No. 32 was subjected to measurement of an order parameter in ZLI-2444. The dye was dissolved in ZLI-2444 in an amount of about 1 wt% and filled in a homogeneous oriented cell with a cell thickness of about 10 micrometers. Thereafter, absorption spectra $A_\parallel$ and $A_\perp$ of the solution with respect to linear polarized light which was passed along directions parallel and perpendicular to the direction of orientation of the liquid crystal were obtained. The order parameter S was calculated according to the equation indicated before, i.e. $S = (A_\parallel - A_\perp)/(A_\parallel + 2A_\perp)$.

This dye had a $\lambda_{max}$ value at 591 nm in ZLI-2444, at which $A_\parallel$ was 1.068 and $A_\perp$ was 0.105. Thus, S=0.75.

EXAMPLE 13

Dye No. 9 was dissolved in ZLI-2444 in an amount of 1 wt% and filled in an about 10 micrometer thick cell. The order parameter S was calculated in the same manner as in Example 12. This dye had a $\lambda_{max}$ value at 569 nm in ZLI-2444, at which $A_\parallel$ was 1.043 and $A_\perp$ was 0.098. Thus, S=0.76.

EXAMPLE 14

Dye No. 23 was dissolved in a mixed liquid crystal, ZLI-1565, (a mixture of a phenylcyclohexane compound, a biphenylcyclohexane compound, a cyclohexylbiphenylcyclohexane and an ester, commercially sold from Merck Inc.) in an amount of 0.8 wt%. The resulting liquid composition was filled in a homogeneous orientation cell having a gap between substrates of about 10 micrometers. The absorbances $A_\parallel$ and $A_\perp$ at a maximal absorption wavelength of 610 nm with respect to linear polarized light passed parallel and perpendicular to the direction of orientation of the liquid crystal, repsectively, were measured, from which the order parameter, S, was calculated.

The value of $A_\parallel$ was found to be 1.021 and $A_\perp$ was 0.0157. Thus, S=0.65.

Similarly, the order parameter of dye No. 20 in ZLI-1565 was found to be S=0.66.

EXAMPLE 15

Dye No. 29 was dissolved in ZLI-1565 in an amount of 0.9 wt% and subjected to measurement of absorbances at a maximal absorption wavelength of 572 nm in the same manner as in Example 12 for calculation of the order parameter, S. The values of $A_\parallel$ and $A_\perp$ at the wavelength were, respectively, found to be 0.731 and 0.132. Thus, S=0.60.

As will be seen from the foregoing, the indigo dyes used in the present invention have high solubilities in host liquid crystal materials and high order parameters, so that they are very useful as pleochroic dyes for use in G-H liquid crystal displays of high contrast.

What is claimed is:

1. A liquid crystal composition comprising, in combination with a host liquid crystal material, at least one guest indigo dye of the following general formula

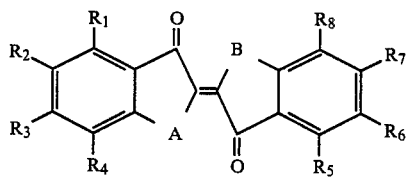

in which A and B independently represent S or N-Y in which Y represents an alkyl group having from 1 to 3 carbon atoms, an acyl group having from 2 to 4 carbon atoms or a hydrogen atom, $R_2$ represents an alkyl group having from 4 to 10 carbon atoms and branched at the alpha carbon, $R_6$ represents a hydrogen atom, a branched or linear alkyl group, a 4-substituted phenyl group, a 4-substituted cyclohexyl group or a 4-substituted phenyloxy group, $R_1$, $R_3$, $R_4$, $R_5$, $R_7$ and $R_8$ independently represent a hydrogen atom, a halogen atom, an alkyl group having from 1 to 3 carbon atoms, an alkoxy group having from 1 to 3 carbon atoms, a nitro group, an amino group, or $-NR_9R_{10}$, in which $R_9$ represents an alkyl group having from 1 to 3 carbon atoms and $R_{10}$ represents a hydrogen atom or an alkyl group having from 1 to 3 carbon atoms.

2. A liquid crystal composition according to claim 1, wherein at least one of A and B in the formula (I) is S.

3. A liquid crystal composition according to claim 2, wherein A and B are both S.

4. A liquid crystal composition according to claim 1, wherein said $R_2$ group is a tertiary alkyl group.

5. A liquid crystal composition according to claim 1, wherein $R_1$, $R_3$, $R_4$, $R_5$, $R_7$ and $R_8$ are independently hydrogen, an alkyl group having from 1 to 3 carbon atoms, an alkoxy group having from 1 to 3 carbon atoms, a nitro group, Cl, Br, an amino group, or a $NR_9R_{10}$ in which $R_9$ is an alkyl group having from 1 to 3 carbon atoms and $R_{10}$ represents hydrogen or an alkyl group having from 1 to 3 carbon atoms.

6. A liquid crystal composition according to claim 1, wherein $R_6$ is the same substituent as $R_2$.

7. A liquid crystal composition according to claim 1, wherein $R_6$ is a 4-substituted phenyl group or 4-substituted cyclohexyl group and $R_2$ is a tertiary alkyl group.

8. A liquid crystal composition according to claim 7, wherein A and B are both S.

9. A liquid crystal composition according to claim 1, wherein said host liquid crystal material comprises a member selected from the group consisting of cyclohexylcyclohexanes, phenylcyclohexanes, biphenyls, terphenyls, cyclohexylcyclohexanoates, aromatic esters, aromatic diesters, biphenylcyclohexylcarboxylates, biphenyl esters, aromatic thioesters, Schiff bases, pyrimidines, cyclohexyl methyl ethers and mixtures thereof.

* * * * *